United States Patent
Anderson et al.

(10) Patent No.: US 12,069,112 B2
(45) Date of Patent: *Aug. 20, 2024

(54) USING A ROUTING RULE TO SIGNAL A CALLER ID NUMBER IN AN OUTBOUND CALL

(71) Applicant: Zoom Video Communications, Inc., San Jose, CA (US)

(72) Inventors: Walter F. C. Anderson, Santa Cruz, CA (US); Brendan James Ittelson, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,305

(22) Filed: Feb. 10, 2023

(65) Prior Publication Data

US 2023/0188580 A1 Jun. 15, 2023

Related U.S. Application Data

(63) Continuation of application No. 17/163,294, filed on Jan. 29, 2021, now Pat. No. 11,611,598.

(51) Int. Cl.
*H04L 65/403* (2022.01)
*H04L 65/1053* (2022.01)
*H04N 7/15* (2006.01)

(52) U.S. Cl.
CPC ........ *H04L 65/403* (2013.01); *H04L 65/1053* (2013.01); *H04N 7/15* (2013.01)

(58) Field of Classification Search
None
See application file for complete search history.

(56) References Cited

U.S. PATENT DOCUMENTS

| 7,394,896 | B2 | 7/2008 | Norton |
| 7,804,949 | B2 | 9/2010 | Wengrovitz |
| 7,885,395 | B2 | 2/2011 | Cadiz et al. |
| 8,213,587 | B2 | 7/2012 | Vendrow |
| 8,411,842 | B1 * | 4/2013 | Wu ..................... H04M 3/5233 370/352 |

(Continued)

OTHER PUBLICATIONS https://www.vonage.com/unified-communications/features/, Unified Communications (UCaaS) features, 3 pages, 2020.

(Continued)

*Primary Examiner* — Mohamed Ibrahim
(74) *Attorney, Agent, or Firm* — Young Basile Hanlon & MacFarlane, P.C.

(57) ABSTRACT

Voice and video features of a software platform are integrated to enable customization of software services of the software platform on a customer-basis. Routing rules are defined to route calls to certain phone numbers from certain software services. Thereafter, when an outbound call is initiated by a software service, the call is received via a telephony system associated with the software platform, a routing rule customized for the software platform is identified based on information signaled with the call, such as an identifier associated with the software service. A phone number is determined based on the routing rule, and the outbound call reporting the determined phone number is delivered to a destination phone number.

20 Claims, 7 Drawing Sheets

(56) References Cited

U.S. PATENT DOCUMENTS

| | | | |
|---|---|---|---|
| 8,804,697 B1* | 8/2014 | Capper | H04L 65/103 |
| | | | 370/352 |
| 9,049,287 B2 | 6/2015 | Masters | |
| 10,075,584 B2 | 9/2018 | Chandra | |
| 10,362,121 B1 | 7/2019 | Crausaz | |
| 10,462,238 B1 | 10/2019 | Naganathan et al. | |
| 10,572,859 B1 | 2/2020 | Evans et al. | |
| 10,581,829 B1* | 3/2020 | Don | H04L 65/403 |
| 10,848,617 B1 | 11/2020 | Liu | |
| 10,873,668 B1 | 12/2020 | Evans et al. | |
| 11,080,096 B1 | 8/2021 | Fakhouri et al. | |
| 11,172,163 B1 | 11/2021 | Chau et al. | |
| 11,245,790 B1 | 2/2022 | Anderson et al. | |
| 2005/0195802 A1 | 9/2005 | Klein et al. | |
| 2006/0072728 A1* | 4/2006 | Cope | H04M 3/56 |
| | | | 379/202.01 |
| 2007/0189481 A1* | 8/2007 | Cadiz | H04M 15/06 |
| | | | 379/142.04 |
| 2008/0043976 A1 | 2/2008 | Maximo et al. | |
| 2008/0112336 A1 | 5/2008 | Gray et al. | |
| 2011/0072141 A1 | 3/2011 | Veenstra et al. | |
| 2011/0295957 A1 | 12/2011 | Ananthanarayanan et al. | |
| 2012/0200518 A1 | 8/2012 | Bear et al. | |
| 2014/0045540 A1 | 2/2014 | Chau et al. | |
| 2015/0016596 A1 | 1/2015 | Bellstedt et al. | |
| 2015/0281442 A1 | 10/2015 | van Rensburg et al. | |
| 2016/0119436 A1 | 4/2016 | Karlsson et al. | |
| 2020/0153448 A1 | 5/2020 | Wang et al. | |

OTHER PUBLICATIONS https://docs.microsoft.com/en-us/microsoftteams/audio-conferencing-on-network, Open Preview of On-network Conferencing for Audio Conferencing, 2 pages, Nov. 13, 2020.

https://docs.microsoft.com/en-us/microsoftteams/how-can-caller-id-be-used-in-your-organization, How can caller ID be used in your organization, 2 pages, Aug. 26, 2020.

https://downloads.avaya.com/css/P8/documents/100109312, Call Routing Server User Guide, Avaya Release 5.0, Contact Center Express, 37 pages, 2010.

International Search Report and Written Opinion in corresponding PCT Application No. PCT/US2022/014292, mailed on May 12, 2022, 30 pages.

Pexip documentation: "Placing calls via the Pexip Infinity Distributed Gateway", Oct. 23, 2020(Oct. 23, 2020) | XP002806348, Retrieved from the Internet: URL:https://web.archive.org/web/20201023025957/https://docs.pexip.com/admin/about_gatewa-ys.htm [retrieved on Apr. 29, 2022] chapter : Placing calls via the Pexip Infinity Distributed Gateway chapter: How it works.

* cited by examiner

USING A ROUTING RULE TO SIGNAL A CALLER ID NUMBER IN AN OUTBOUND CALL

CROSS-REFERENCE TO RELATED APPLICATION(S)

This application is a continuation of U.S. patent application Ser. No. 17/163,294, filed Jan. 29, 2021, the entire disclosure of which in herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for outbound call routing in an integrated voice and video platform.

One aspect of this disclosure is a system, which includes a data store, a first server, and a second server. The data store stores routing rules customized for a software platform. The first server includes a routing engine and a private branch exchange, in which the routing engine identifies a caller ID number to signal to a destination phone with an outbound call initiated by a software service of the software platform based on a routing rule of the routing rules and the private branch exchange signals the caller ID number with the outbound call to the destination phone. The second server provides the software service.

Another aspect of this disclosure is a method, which includes initiating an outbound call from a software service of a software platform. A routing rule customized for the software platform is identified based on information signaled from the software service. A caller ID number to signal to a destination phone is identified based on the routing rule. The caller ID number is signaled with the outbound call to the destination phone.

Yet another aspect of this disclosure is a system, which includes a meeting server a and telephony server. The meeting server runs virtual meeting software of a software platform at which an outbound call to a destination phone is initiated. The telephony server identifies a caller ID number based on a routing rule customized for a customer of the software platform and signals the caller ID number with the outbound call to the destination phone.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
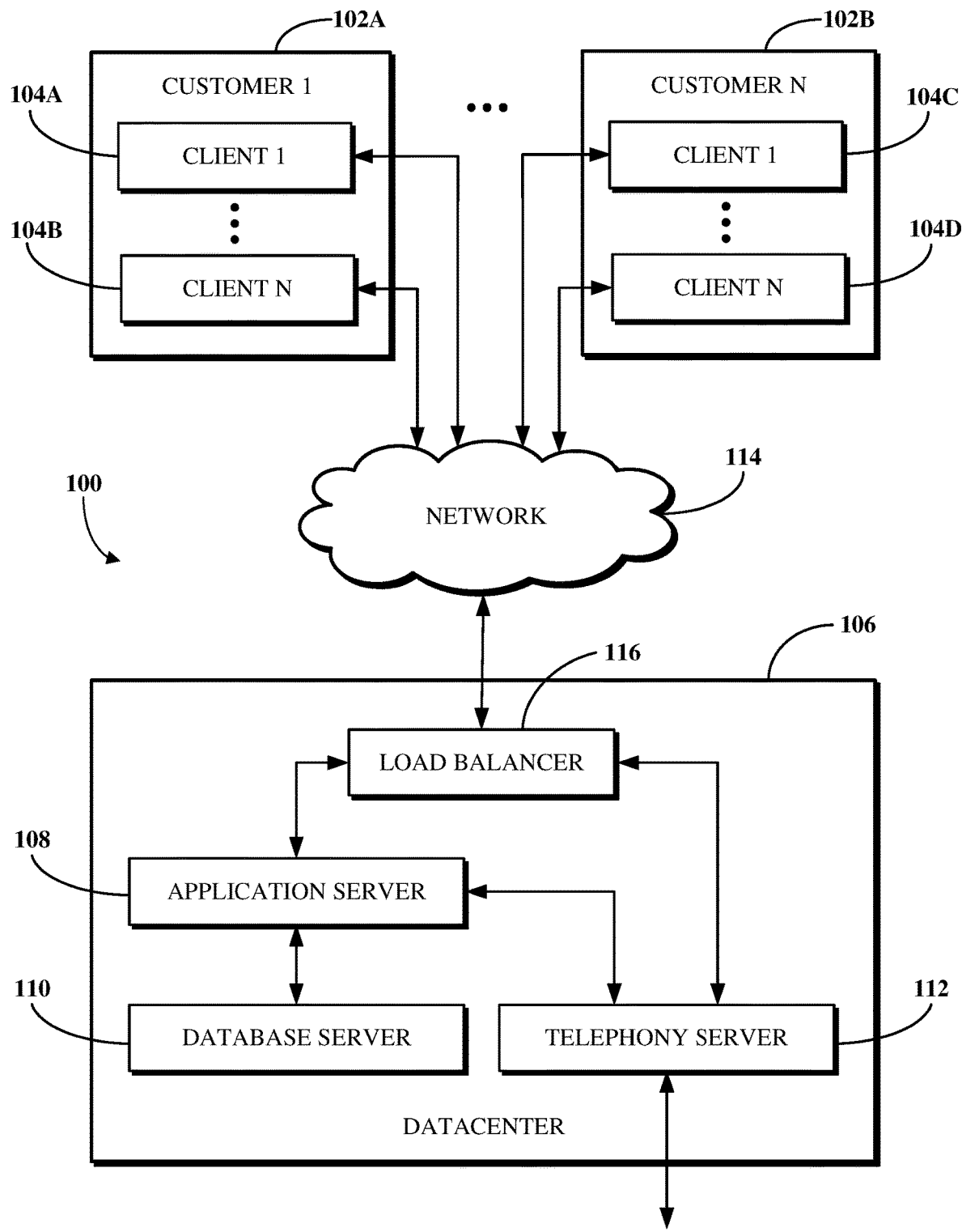
FIG. 1 is a block diagram of an example of an electronic computing and communications system.

Conventional UCaaS platforms implement a range of communication and collaboration tools, including, for example, telephony services and conferencing services. UCaaS platforms are typically implemented using multi-tenant architecture in which infrastructure and software instantiations are shared between platform users. While the typical UCaaS platform architecture allows users to access the same services, it does not enable customization on the basis of specific users. For example, outbound caller ID numbers and call information for multi-tenant conferencing services are typically shared across all users of a conventional UCaaS platform because a conventional UCaaS platform does not allow individual users to customize such outbound numbers or information. Furthermore, given this inflexibility on the part of conventional UCaaS platforms to allow customizations for individual users, there is no mechanism by which to route calls to certain phone numbers or extensions, for example, local or toll free phone numbers or extensions, from software services of such a UCaaS platform.

Implementations of this disclosure address problems such as these by integrating voice and video features of a software platform, which may, for example, be a UCaaS platform. Routing rules are defined to route calls to certain phone numbers from certain software services. Thereafter, when an outbound call is initiated by a software service, the call is received via a telephony system associated with the software platform, a routing rule customized for the software platform is identified based on information signaled with the call, such as an identifier associated with the software service. A phone number is determined based on the routing rule, and the outbound call reporting the determined phone number is delivered to a destination phone number. As such, the routing rules disclosed herein may be generated and used on a customer-basis to customize aspects of a multi-tenant software platform for individual customers thereof.

The implementations of this disclosure thus allow for numerous customization approaches for integrating telephony services of a software platform with software services of that software platform. For example, a routing rule may be defined to deliver outbound calls from a software service of the software platform to a destination phone number using a caller ID number assigned to a customer of the software platform, such as a local or toll free number anywhere within a service area of the software platform. In some cases, the caller ID number is a main service number assigned for the customer. In some cases, the caller ID number is one of a number of possible service numbers assigned for the customer, in which the routing rule identifies the selected service number based on information relevant to the particular instance of the software service making the outbound call.

In an example use case, a participant of a virtual meeting implemented using virtual meeting software for a customer of the software platform may initiate a process to have another participant join the virtual meeting from a phone. The process may be started by the current participant selecting an option of the virtual meeting software to invite a participant to join the virtual meeting by phone or to otherwise make a call to a certain phone number. In either case, an outbound call is initiated and transmitted from the system running the virtual meeting software to a telephony system for the customer. A routing engine at the telephony system searches a data store that stores routing rules defined for the customer to identify a routing rule associated with the virtual meeting. The routing rule identifies a caller ID number to use for the outbound call and information associated with the caller ID number, such as a business or person name to signal. The outbound call is signaled with the caller ID number and information and then output for delivery to the destination phone number. When the operator of the phone associated with the destination phone number, or destination phone, receives the call, the destination phone represents the caller ID number and information as the one signaled rather than the default phone number for the virtual meeting software service.

The ability for customers of a multi-tenant software platform to customize caller ID numbers and information delivered to phone operators from software services of the software platform further improves the likelihood of call connection to the destination phone. That is, an operator of a phone who receives a phone call reported as being from a business or person they know is statistically more likely to answer than if they were to receive a phone call reported as being a generic number for a communication service. Using the implementations of this disclosure, a customer of a software platform can customize caller ID numbers and information to ensure that someone invited to join a virtual meeting or other communication receives a call from a business or person they know or trust.

To describe some implementations in greater detail, reference is first made to examples of hardware and software structures used to implement outbound call routing in an integrated voice and video platform. FIG. 1 is a block diagram of an example of an electronic computing and communications system 100, which can be or include a distributed computing system (e.g., a client-server computing system), a cloud computing system, a clustered computing system, or the like. The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other data stores suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over interne protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database or other data store for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
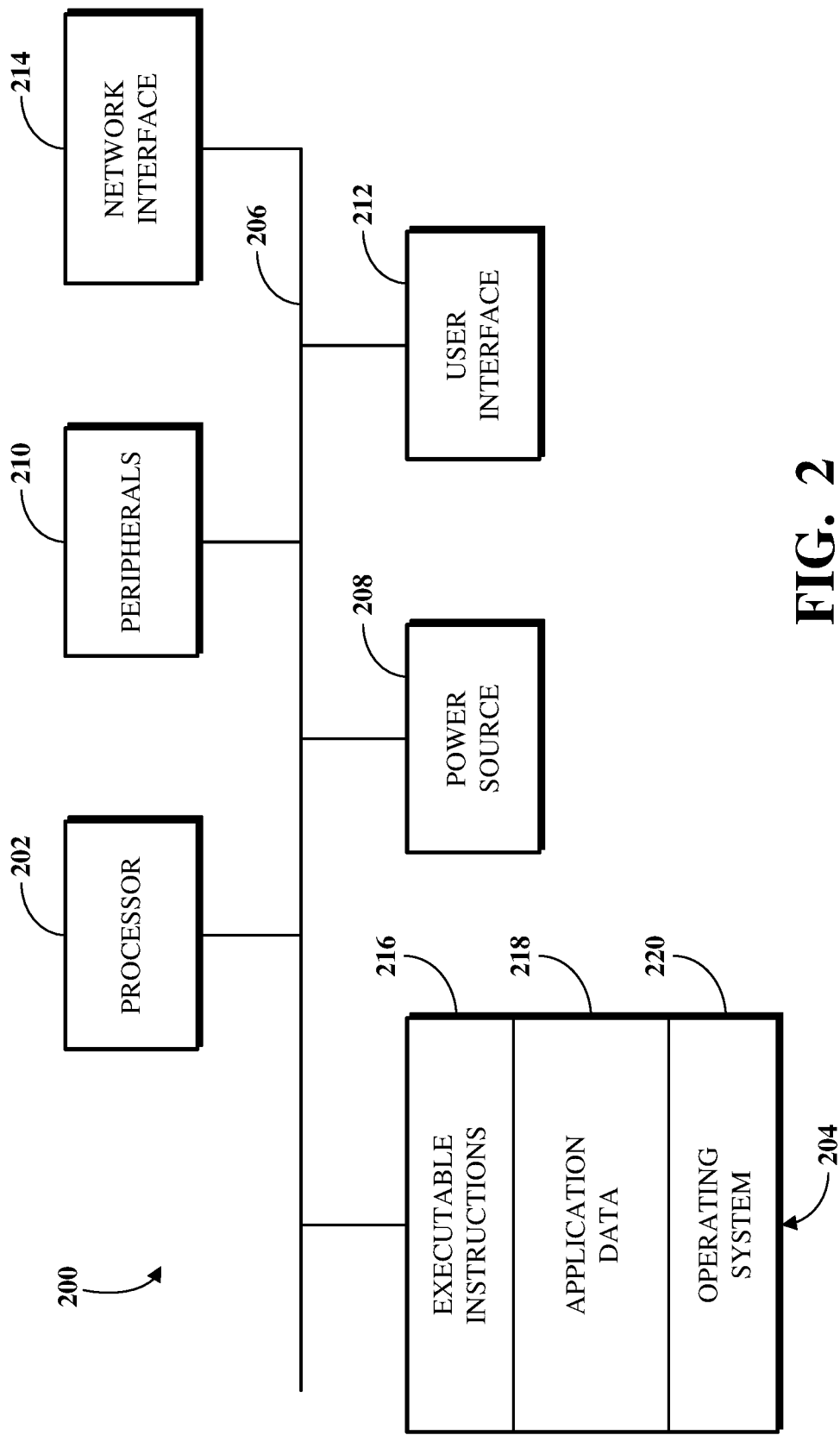
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
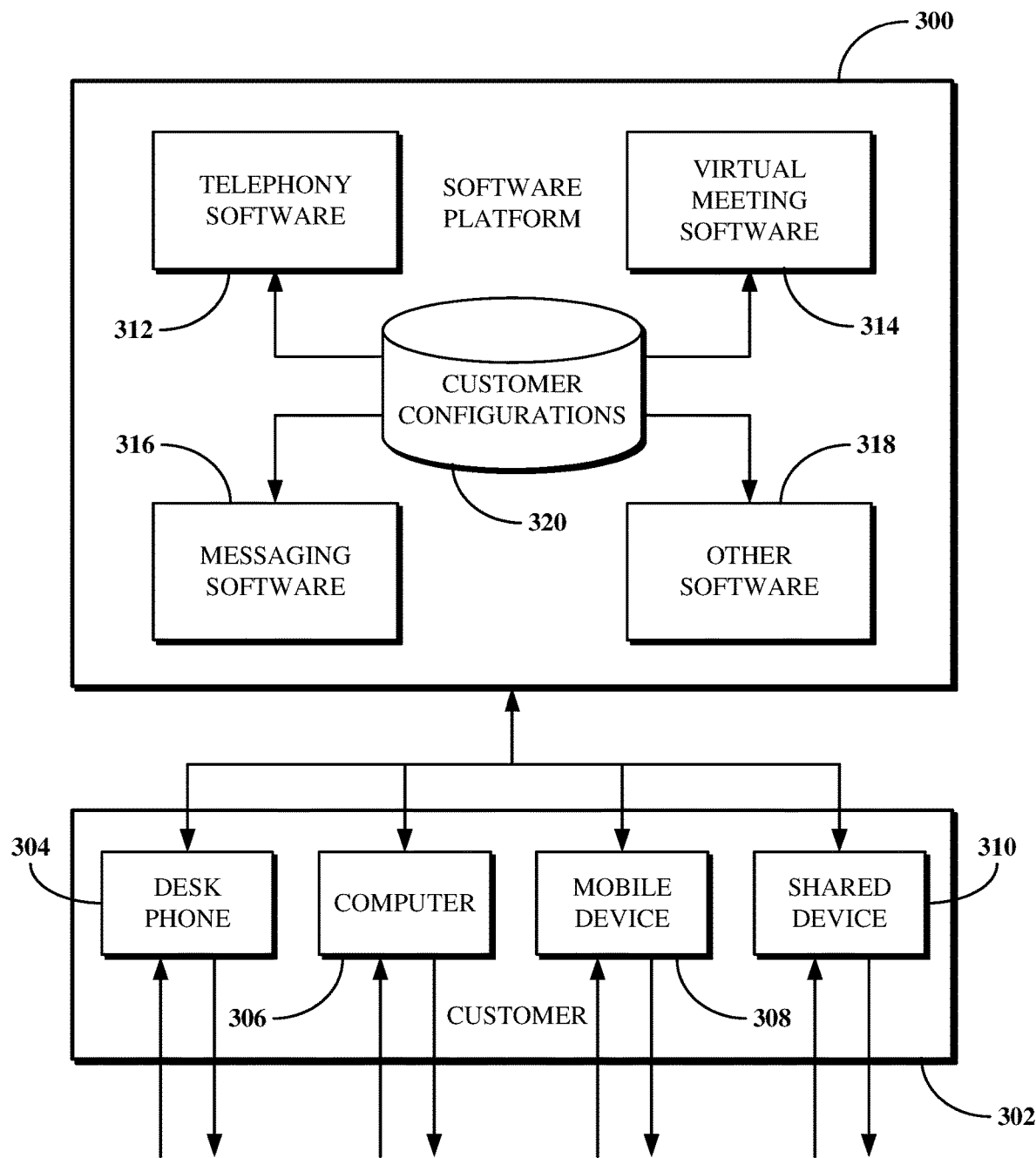
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtual meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls to phones not associated with the customer 302 to route that telephony traffic from one or more of the virtual meeting software 314, the messaging software 316, or the other software 318.

The virtual meeting software 314 enables audio, video, and/or other forms of virtual meetings between multiple devices, such as to facilitate a conference between the users of those devices. The virtual meeting software 314 can include functionality for hosting, presenting scheduling, joining, or otherwise participating in a virtual meeting. The virtual meeting software 314 may further include functionality for recording some or all of a virtual meeting and/or documenting a transcript for the virtual meeting.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a routing engine for routing calls from phones received over a telephony system to software services of the software platform 300.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtual meeting. In yet another example, the virtual meeting software 314 may include functionality for sending and receiving instant messages between participants and/or other users of the customer 302. In yet another example, the virtual meeting software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
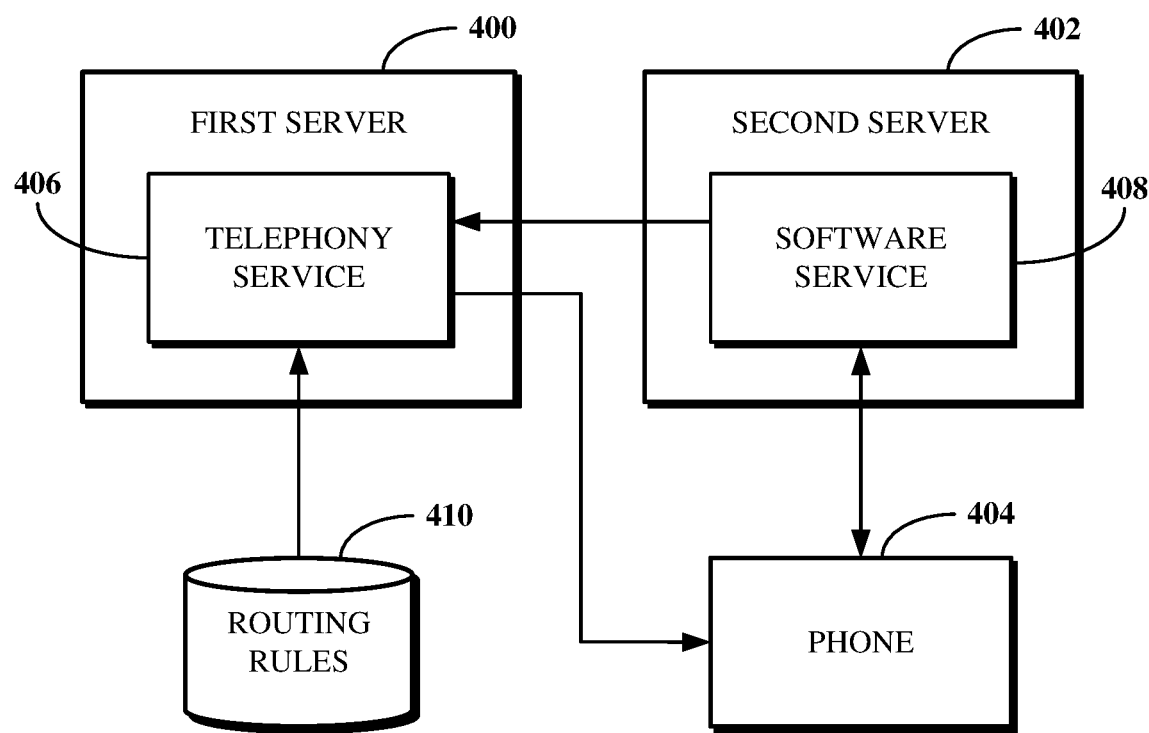
FIG. 4 is a block diagram of an example of servers used to integrate voice and video features of a software platform.

FIG. 4 is a block diagram of an example of servers used to integrate voice and video features of a software platform, which may, for example, be the software platform 300 shown in FIG. 3. As shown, a first server 400 and a second server 402 communicate based on an outbound call for delivery to a phone 404. The first server 400 includes a telephony service 406. The second server includes a software service 408. The call is initiated at the software service 408 and processed by the telephony service 406 to route the call to the phone 404.

The phone 404 may be a phone associated with a customer of the software platform (e.g., the desk phone 304 or the mobile device 308 of the customer 302 shown in FIG. 3) or a phone which is not associated with a customer of the software platform. For example, the phone 404 may or may not have a client application associated with the software service 408 or the software platform installed or otherwise running thereon. Routing the call from the software service 408 enables an operator of the phone 404 to connect to software of the software platform, which may, for example, be one of the software 312 through 318 shown in FIG. 3. Although the first server 400 and the second server 402 are shown as separate servers, in some implementations, a single server may include both the telephony service 406 and the software service 408.

The outbound call is initiated at the software service 408. An operator of a client (e.g., one of the clients 304 through 310 shown in FIG. 3) may be a participant to an instance of software of the software service 408 for a customer. The participant of the software may initiate the call from the software service 408 to the phone 404 to cause an operator of the phone 404 to become a participant of the software. For example, the current participant may select an option of the software to invite a participant to join the instance of the software from the phone 404 or to otherwise make a call to a certain phone number associated with the phone 404. The software service 408 then transmits a call to the telephony service 406 for processing and routing to the phone 404.

The telephony service 406 includes one or more telephony aspects which receive and process an outbound call from the software service 408 to the phone 404. For example, the telephony service 406 may be implemented using the telephony server 112 shown in FIG. 1. The telephony service 406 may include one or more of a PBX, a SBC, and/or other telephony aspects. The telephony service 406 accesses a data store 410 storing routing rules to determine how to route the call from the software service 408 to the phone 404. The data store 410 may be a database or other data store associated with the software platform. For example, the data store 410 may be implemented using the database server 110 shown in FIG. 1.

In particular, the routing rules stored in the data store 410 are generated to identify a caller ID number and caller information to report to destination phones, such as the phone 404, when those phones receive calls from software services of the software platform (e.g., the software service 408 or another software service). Thus, a routing rule indicates how to route a call from a main service number or other service number associated with the software service 408 to the phone 404 so that a certain phone number and caller name is reported for the call instead of the main service number or other service number.

For example, a first routing rule may indicate that an outbound call initiated from a virtual meeting software service (e.g., the software service 408) should be routed to a destination phone (e.g., the phone 404) using a first phone number as a main meeting service number for a customer of the software platform, so as to enable the operator of the destination phone to participate in a virtual meeting implemented by the virtual meeting software service for the customer. The information signaled with the call to the destination phone may identify the name of the customer along with the first phone number.

In another example, a second routing rule may indicate that an outbound call initiated from a virtual meeting software service phone call should be routed to a destination phone using a second phone number other than the main meeting service number for a certain operator at a customer of the software platform, so as to enable the operator of the destination phone to participate in a virtual meeting implemented by the virtual meeting software service for that certain operator at the customer. The information signaled with the call to the destination phone may identify the name of the certain operator and/or the name of the customer along with the second phone number.

The routing rules may be generated at a device registered with the software platform. For example, the device may be one of the clients 304 through 310 shown in FIG. 3. Generating a routing rule may include customizing a routing pathway for a call from the telephony service 406 to a destination phone, for example, the phone 404. In some implementations, the routing rule may be associated with an identifier for the software service 408. For example, the identifier may be a meeting identifier used to identify a specific virtual meeting to which to connect an operator of the phone 404 where the software service 408 is or includes virtual meeting software.

Although the software service 408 is a multi-tenant software aspect delivered to multiple users and customers of the software platform, the phone numbers and associated information identified within a routing rule and thus used to generate a routing rule a customized for a specific customer. In this way, customers who wish to reach an operator of a phone may enable the operator of the phone to connect to a particular instance of the software service (e.g., a particular virtual meeting) from a phone call reported at the phone as being from phone number which is specific to that customer.

Figure 5:
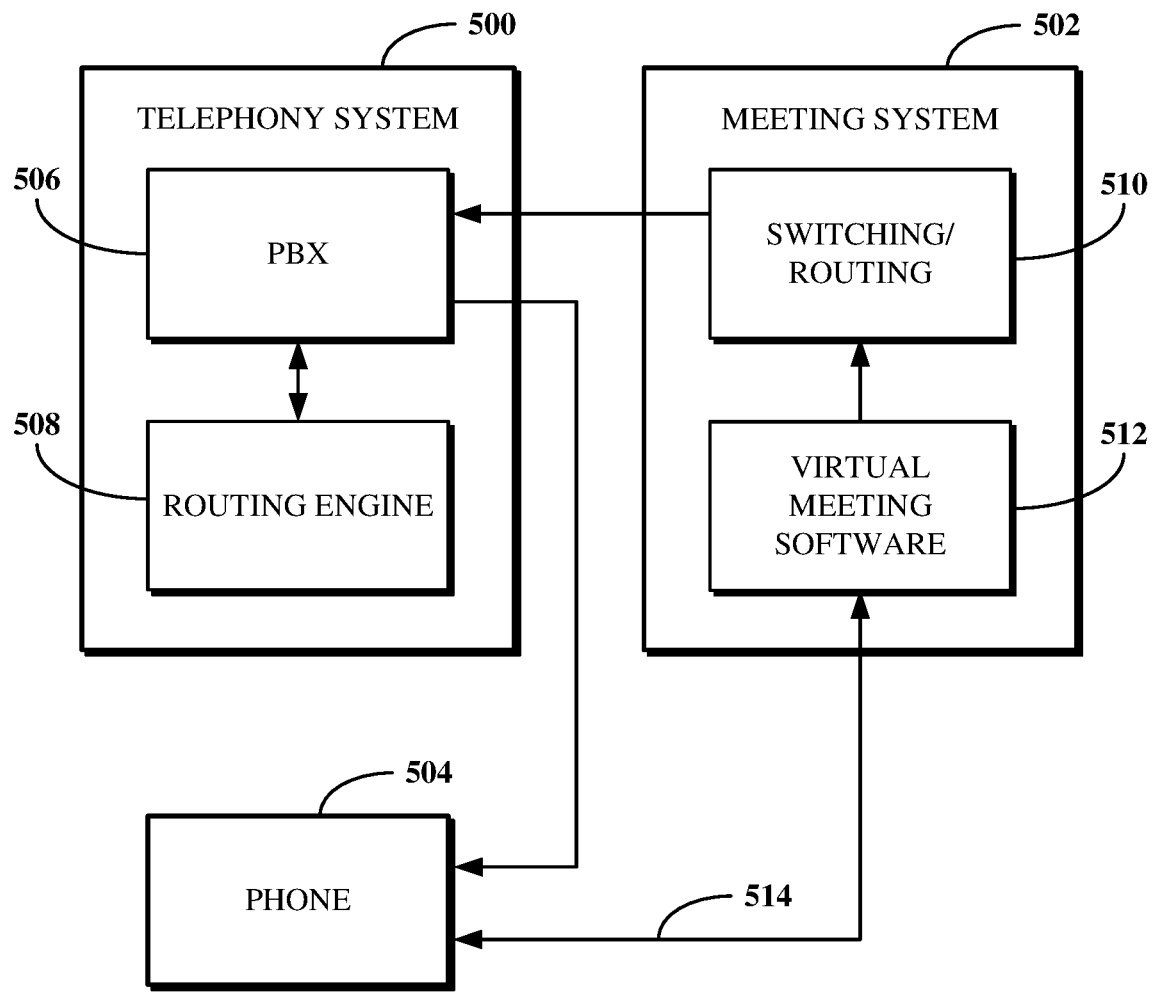
FIG. 5 is a block diagram of an example of a telephony system and a meeting system of a software platform.

FIG. 5 is a block diagram of an example of a telephony system 500 and a meeting system 502 of a software platform, which may, for example, be the software platform 300 shown in FIG. 3. The telephony system 500 routes a call initiated at a software service implemented using the meeting system 502, which may, for example, be the software service 408 shown in FIG. 4, to a phone 504, which may, for example, be the phone 404 shown in FIG. 4. The telephony system 500 and the meeting system 502 may be implemented on the same or different servers. In some implementations, the telephony system 500 may be implemented on a first server, for example, the first server 400 shown in FIG. 4, and the meeting system 502 may be implemented on a second server, for example, the second server 402 shown in FIG. 4. For example, the telephony system 500 may be or include the telephony service 406 shown in FIG. 4 and the meeting system 502 may be or include the software service 408 shown in FIG. 4.

The telephony system 506 includes a PBX 506 and a routing engine 508. The PBX 506 is a PBX of the software platform and is configured to handle and process telephony traffic for one or more customers of the software platform. The routing engine 508 is software which processes calls received at the telephony system 500 using routing rules customized for a customer of the software platform to determine caller ID number and naming information to signal with calls sent from the meeting system 502 to the phone 504. For example, the routing engine 508 may access a data store that stores the routing rules to identify a routing rule for a call received from the meeting system 502. The data store may, for example, be the data store 410 shown in FIG. 4. A routing rule identified based on a call configures the PBX to route the call to phone 504 using the caller ID number and naming information associated with the routing rule.

The meeting system 502 includes a switching/routing tool 510 and virtual meeting software 512. The virtual meeting software 512, which may, for example, be the virtual meeting software 314 shown in FIG. 3, implements virtual meetings as instances of the virtual meeting software 512. A virtual meeting includes transmitting and receiving video, audio, and/or other data between clients and/or phones of virtual meeting participants. Each client and phone may connect to the virtual meeting software 512 through the meeting system 502 using separate input streams to enable operators thereof to participate in a virtual meeting together using the virtual meeting software 512.

The virtual meeting software 512 includes a dedicated meeting view for each input stream received and processed at the meeting system 502. For example, a meeting view may be represented within a graphical user interface (GUI) of the virtual meeting software 512 by a dedicated box for a given participant. The content of the meeting view for a given participant may be dependent upon the source of the input stream for that participant. For example, where a participant accesses the virtual meeting software 512 from a client, the meeting view for the participant may include a video output stream transmitted from the meeting system for viewing by all participants based on a video input stream received from the client, although the participant may optionally disable video features to suspend the video output stream from being presented in the meeting view. In another example, where a participant access the virtual meeting software 512 from a phone, such as the phone 504, the meeting view for the participant may be limited to a static image or other default background aspect since there is no video output stream produced for that participant.

The switching/routing tool 510 directs bitstreams through applicable network infrastructure and/or other hardware to deliver the bitstreams to the virtual meeting software 512. The virtual meeting software 512 delivers output bitstreams representative of the respective encoded streams to each connected client and/or phone. In some implementations, the switching/routing tool 510 may be included in the virtual meeting software 512.

To invite or otherwise cause an operator of the phone 504 to participate in a virtual meeting at the virtual meeting software 512, a participant of the virtual meeting software 512 initiates a process through the virtual meeting software 512 to transmit a call to the phone 504. For example, the participant of the virtual meeting software 512 may indicate a phone number associated with the phone 504 within an invite to meeting or like aspect of the virtual meeting software 512. The virtual meeting software 512 then initiates a call by transmitting a signal indicating the phone number to call to the telephony system 500. The PBX 506 receives the signal and tasks the routing engine 508 with identifying a routing rule indicating how to signal the call to the phone number. In particular, the routing engine 508 searches for a routing rule which identifies the caller ID number and name information to signal for calls initiated at the virtual meeting software 512 generally or for calls initiated at the particular instance of the virtual meeting software 512 (e.g., the particular virtual meeting). The PBX 506 then delivers the call to the phone device associated with the phone number indicated in the virtual meeting software 512, in which the call is signaled with the caller ID number and name information identified by the routing rule. Upon answering the call at the phone 504, a channel 514 is opened between the phone 504 and the virtual meeting software 512 to allow the operator of the phone 504 to participate in the virtual meeting.

In some implementations, other software services may be accessible in connection with a virtual meeting implemented using the meeting system 502. For example, a virtual meeting may include or otherwise integrate functionality for instant messaging, unified messaging, and other types of messaging communications between participants of the virtual meeting, such as to facilitate a chat or like virtual conversation between users of those participants. Those other software services may be implemented at the meeting system 502 and/or a different aspect of the software platform.

Figure 6:
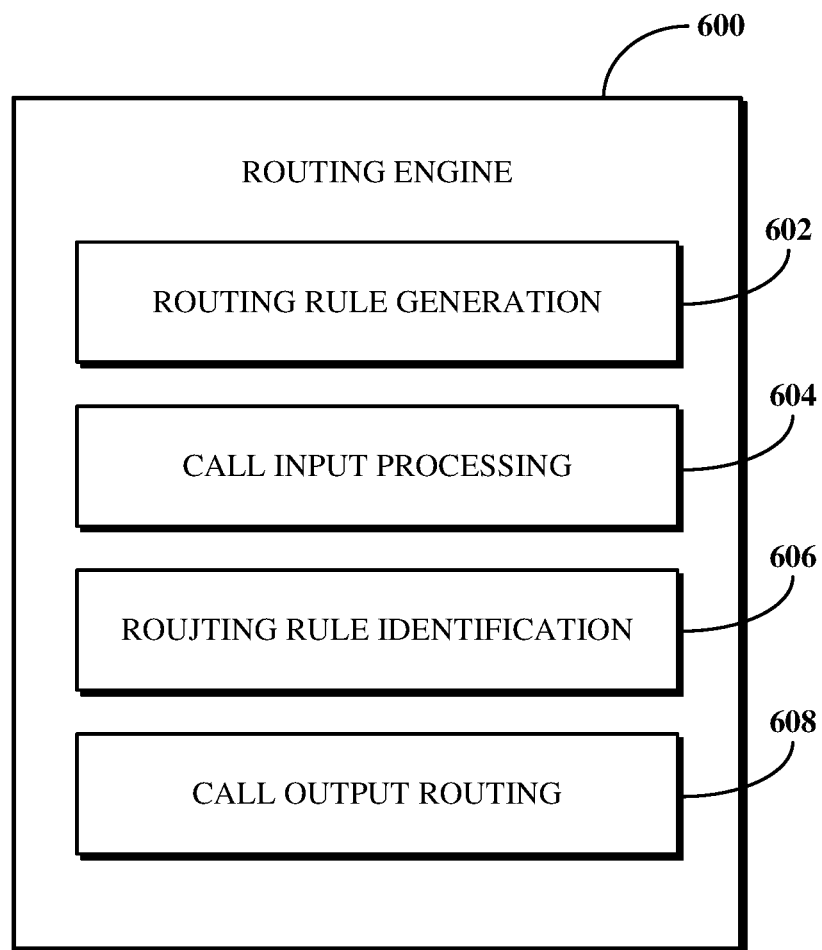
FIG. 6 is a block diagram of example functionality of a routing engine used by a telephony system of a software platform.

FIG. 6 is a block diagram of example functionality of a routing engine 600 used by a telephony system of a software platform. For example, the routing engine 600 may be the routing engine 508 shown in FIG. 5 and the software platform may be the software platform 300 shown in FIG. 3. The routing engine 600 includes software tools for routing calls from software services of the software platform over a telephony system to phones. As shown, the routing engine 600 includes a routing rule generation tool 602, a call input processing tool 604, a routing rule identification tool 606, and a call output routing tool 608. Although the tools 602 through 608 are shown as functionality of the routing engine 600 as a single piece of software, in some implementations, some or all of the tools 602 through 608 may exist outside of the routing engine 600.

The routing rule definition tool 602 is used to generate routing rules for routing calls from software services of a software platform. An operator of a device registered with the software platform for a customer of the software platform provides input used to generate a routing rule. The input identifies the software service or instance thereof from which a call may be initiated and one or both of a caller ID number or name information to signal with the call to the destination phone. For example, the routing rule may identify virtual meeting software, for example, the virtual meeting software 512 shown in FIG. 5, or an instance thereof and a specific phone number and/or caller name to report to a phone which receives the call. Examples of the name information identified within a routing rule may be or include a business name, a name of a person, or another word, term, or phrase usable to identify a caller.

The call input processing tool 604 processes input to the routing engine 600, which is a call initiated from a software service, for example, the software service 508 shown in FIG. 5. The call may, for example, be received from a PBX, such as the PBX 506 shown in FIG. 5. The call input processing tool 604 in particular processes the call to identify information signaled with the call which is usable to identify a routing rule. For example, the information signaled with the call may be one or more of an indication of the software service, a customer-agnostic phone number associated with the software service, an indication of a specific instance of the software service, a name of the customer hosting the virtual meeting, or the like. For example, the information signaled with the call may include a meeting identifier for a virtual meeting, an identifier representative of a participant of a virtual meeting who initiated the process for the call from the software service, or the like.

The routing rule identification tool 606 searches a data store that stores routing rules based on the information signaled with the call to identify a routing rule to use to route the call to the destination phone. For example, the routing rule identification tool 606 may search the data store based on a meeting identifier of a virtual meeting, a name of the customer hosting the virtual meeting, or the like. A routing rule is identified where that routing rule identifies the signaled information.

The call output routing tool 608 outputs the call for routing from the software platform (e.g., from telephony services thereof) to the destination phone. In particular, the call output routing tool 608 signals the caller ID number and/or name information identified by the routing rule and to cause the call to be transmitted to the destination phone. For example, the call output routing tool 608 may signal the caller ID number and/or name information to the PBX which will use that information to transmit the call to the destination phone with the caller ID number and/or name information reported with the call.

Figure 7:
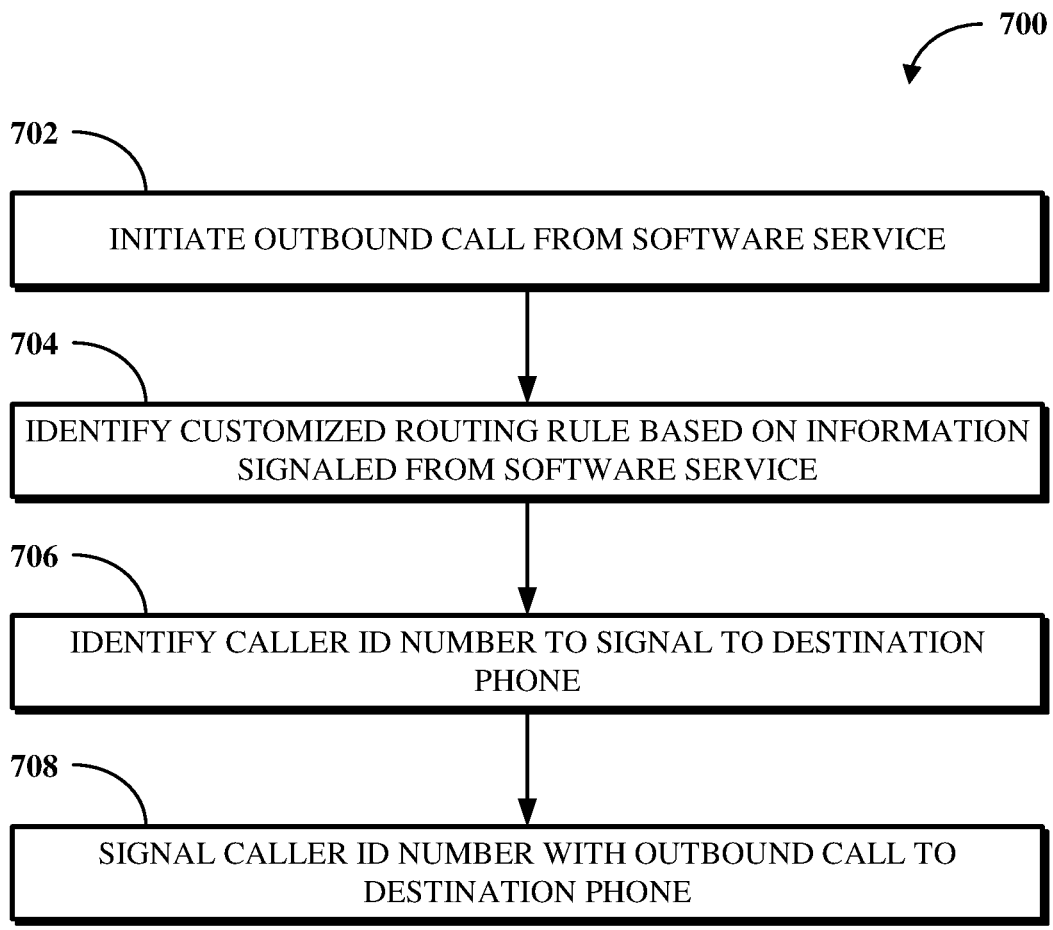
FIG. 7 is a flowchart of an example of a technique for routing a call from a software service in an integrated voice and video platform.

To further describe some implementations in greater detail, reference is next made to examples of techniques which may be performed by or using an integrated voice and video platform. FIG. 7 is a flowchart of an example of a technique 700 for routing a call from a software service in an integrated voice and video platform, such as a UCaaS platform. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, an outbound call is initiated from a software service of a software platform. The software service may, for example, be or include virtual meeting software for implementing virtual meetings. The outbound call is initiated by an operator of the software service (e.g., a participant of a virtual meeting implemented by the virtual meeting software) inviting an operator of a destination phone to connect to the software service.

At 704, a routing rule customized for the software platform is identified based on information signaled from the software service. The routing rule is generated for customer of the software platform. In particular, the routing rule identifies a phone number assigned for the customer of the software platform, and further identifies to use that phone number to signal outbound calls from the software service. Thus, the routing rule is customized in that it is based on a customized phone number for the customer.

The information signaled from the software service includes information usable to identify the routing rule. For example, the information signaled from the software service may include a main service number for the customer of the software platform (e.g., a main meeting service number where the software service is or includes virtual meeting software). For example, where the software service is or includes virtual meeting software, the information signaled from the software service may include a meeting identifier associated with a virtual meeting implemented by the virtual meeting software.

The routing rule may be generated using a device registered with the software platform. For example, a client of the customer of the software platform may generate the routing rule or cause same to be generated by indicating a phone number to use as a caller ID number for outbound calls from the software service. In some implementations, multiple routing rules may be generated for the customer of the software platform, in which each of the routing rules may be defined to identify different caller ID numbers for different software services.

At 706, a caller ID number to signal to a destination phone is identified based on the routing rule. The routing rule corresponds to the software service and identifies the caller ID number to signal to destination phones for outbound calls initiated by that software service. In some implementations, the routing rule further identifies name information to signal to destination phones for outbound calls initiated by that software service. For example, the name information may identify the customer of the software platform or an operator of the customer. In some such implementations, the name information and the caller ID number are both identified.

At 708, the caller ID number is signaled with the outbound call to the destination phone. Thus, when the outbound call is received at the destination phone, the signaling of the caller ID number causes the destination phone to indicate that the outbound call is coming from the caller ID number. In some implementations, name information may be signaled with the outbound call to the destination phone instead of or in addition to the caller ID number.

The outbound call is configured to connect the destination phone with the software service, for example, by opening a channel between the destination phone and the software service. For example, where the software service is or includes virtual meeting software, the answering of the outbound call at the destination phone causes an operator of the destination phone to join a virtual meeting implemented at the virtual meeting service as a participant. In some implementations, the software service may be launched at the destination phone.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    identifying, based on an outbound call from a video virtual meeting service of a software platform to a destination phone, a routing rule for controlling a signaling of a caller ID number configured for outbound calls from the video virtual meeting service as an outbound telephone number; and
    signaling, by a telephony service of the software platform invoking the routing rule based on the outbound call, the caller ID number with the outbound call to the destination phone.

2. The method of claim 1, comprising:
    identifying the caller ID number by invoking the routing rule.

3. The method of claim 1, comprising:
    opening a channel between the destination phone and the video virtual meeting service.

4. The method of claim 1, comprising:
    initiating the outbound call based on an invitation from a participant of a video virtual meeting implemented using the video virtual meeting service.

5. The method of claim 1, wherein the routing rule is customized for a specific instance of the video virtual meeting service.

6. The method of claim 1, wherein the routing rule is specific to a customer of the software platform.

7. The method of claim 1, wherein the outbound call is configured to connect the destination phone to the video virtual meeting service.

8. The method of claim 1, wherein the routing rule is identified based on a meeting identifier associated with the video virtual meeting service.

9. A non-transitory computer readable medium storing instructions that, when executed by a processor, cause a performance of operations comprising:
    identifying, based on an outbound call from a video virtual meeting service of a software platform to a destination phone, a routing rule for controlling a signaling of a caller ID number configured for outbound calls from the video virtual meeting service as an outbound telephone number; and
    signaling, by a telephony service of the software platform invoking the routing rule based on the outbound call, the caller ID number with the outbound call to the destination phone.

10. The non-transitory computer readable medium of claim 9, wherein the caller ID number is a main meeting service number for an operator associated with a customer of the software platform.

11. The non-transitory computer readable medium of claim 9, wherein the caller ID number is other than a main meeting service number for an operator associated with a customer of the software platform.

12. The non-transitory computer readable medium of claim 9, wherein the routing rule is identified based on a main meeting service number assigned for a customer of the software platform.

13. The non-transitory computer readable medium of claim 9, wherein the software platform is a unified communications as a service software platform.

14. An apparatus, comprising:
    a memory; and
    a processor configured to execute instructions stored in the memory to:
        identify, based on an outbound call from a video virtual meeting service of a software platform to a destination phone, a routing rule for controlling a signaling of a caller ID number configured for outbound calls from the video virtual meeting service as an outbound telephone number; and signal, by a telephony service of the software platform invoking the routing rule based on the outbound call, the caller ID number with the outbound call to the destination phone.

15. The apparatus of claim 14, wherein, to identify the routing rule, the processor is configured to execute the instructions to:

searching, based on the outbound call, a data store storing routing rules to identify the routing rule.

16. The apparatus of claim 14, wherein the routing rule further identifies a business or person name to signal alongside the caller ID number with the outbound call.

17. The apparatus of claim 14, wherein the outbound call is initiated to invite an operator of the destination phone to participate in a virtual meeting implemented using the video virtual meeting service.

18. The apparatus of claim 14, wherein the caller ID number is customized for a customer of the software platform.

19. The apparatus of claim 14, wherein the caller ID number replaces a default number for the video virtual meeting service within the outbound call.

20. The apparatus of claim 14, wherein the video virtual meeting service and the telephony service are operated on separate servers.

* * * * *